April 12, 1955

C. HARDEN 2,705,984

CITRUS JUICE EXTRACTING MACHINE

Filed Jan. 2, 1951

CARL HARDEN,
INVENTOR.

BY *Lyon & Lyon*

ATTORNEYS

CARL HARDEN,
INVENTOR.

BY Lyon & Lyon
ATTORNEYS

April 12, 1955  C. HARDEN  2,705,984
CITRUS JUICE EXTRACTING MACHINE
Filed Jan. 2, 1951  3 Sheets-Sheet 3

CARL HARDEN,
INVENTOR.

BY
Lyon & Lyon
ATTORNEYS

United States Patent Office 2,705,984
Patented Apr. 12, 1955

2,705,984

CITRUS JUICE EXTRACTING MACHINE

Carl Harden, Pasadena, Calif., assignor to Brown Citrus Machinery Corp., Whittier, Calif., a corporation of California Application January 2, 1951, Serial No. 204,035

16 Claims. (Cl. 146—3)

This invention relates to juice extracting machines and has particular reference to improvements in citrus juice extracting machines.

One of the principal objects of my invention is to provide a citrus juice extracting machine having novel and improved means for continuously wiping or cleaning the juice collecting portions thereof to prevent the accumulation of bacteria-breeding pulp.

Another important object of my invention is to provide a citrus juice extracting machine having novel and improved means for separating the extracted juice and pulp from the peel of the citrus fruit.

Another object of my invention is to provide a citrus juice extracting machine having a high rate of juice recovery, the juice collecting portion of said machine being constructed to avoid spatter of the juice through the peel discharge opening.

Citrus juice extracting machines of the type described above are provided with a vertical knife blade for halving the fruit. The halves are picked up, cut portion downwardly, by cups mounted on a cup carrier unit which rotates on a vertical axis. Mounted below the cup carrier unit is a reamer unit consisting of a carrier mounting a plurality of upwardly extending rotating reamers. The reamer carrier is mounted for rotation about an axis inclined from the vertical and is geared with the cup carrier unit so that the reamers are carried around in synchronism with the cups to enter the same by reason of the inclined path of travel of the reamers. The two units are enclosed in a casing, the bottom portion of which forms a collection pan for the extracted juice and pulp. It is desirable to form the casing in two portions consisting of a cover member and a pan member separated on a horizontal plane, so that the carrier units are easily accessible for cleaning and adjustment. One of the objects of my invention is, then, to provide a pan member of compound curved shape having an upper horizontal portion which is circular in cross-section for cooperation with the cylindrical cover member and a lower portion normal to the inclined axis of the reamer unit which is also circular in cross-section.

Another object of my invention is to provide a grid mounted for rotation on the reamer carrier unit, the grid being adapted to separate the fruit peel from the extracted juice and pulp.

Another object of my invention is to provide a citrus juice extracting machine having an annular separating grid mounted for rotation on the reamer carrier unit, and a juice collecting pan enclosing the reamer carrier unit, the sides of the juice collecting pan adjacent the grid being concentric thereto, so that the clearance between the grid and the adjacent pan sides is substantially uniform.

A further object of my invention is to provide a machine of the type described above wherein a wiper blade is mounted to rotate with the reamer carrier unit, the circular bottom of the pan permitting the entire bottom to be wiped clean by the wiper blade.

Other objects and advantages of this invention it is believed will be apparent from the following detailed description of a preferred embodiment thereof as illustrated in the accompanying drawing.

Figure 1:
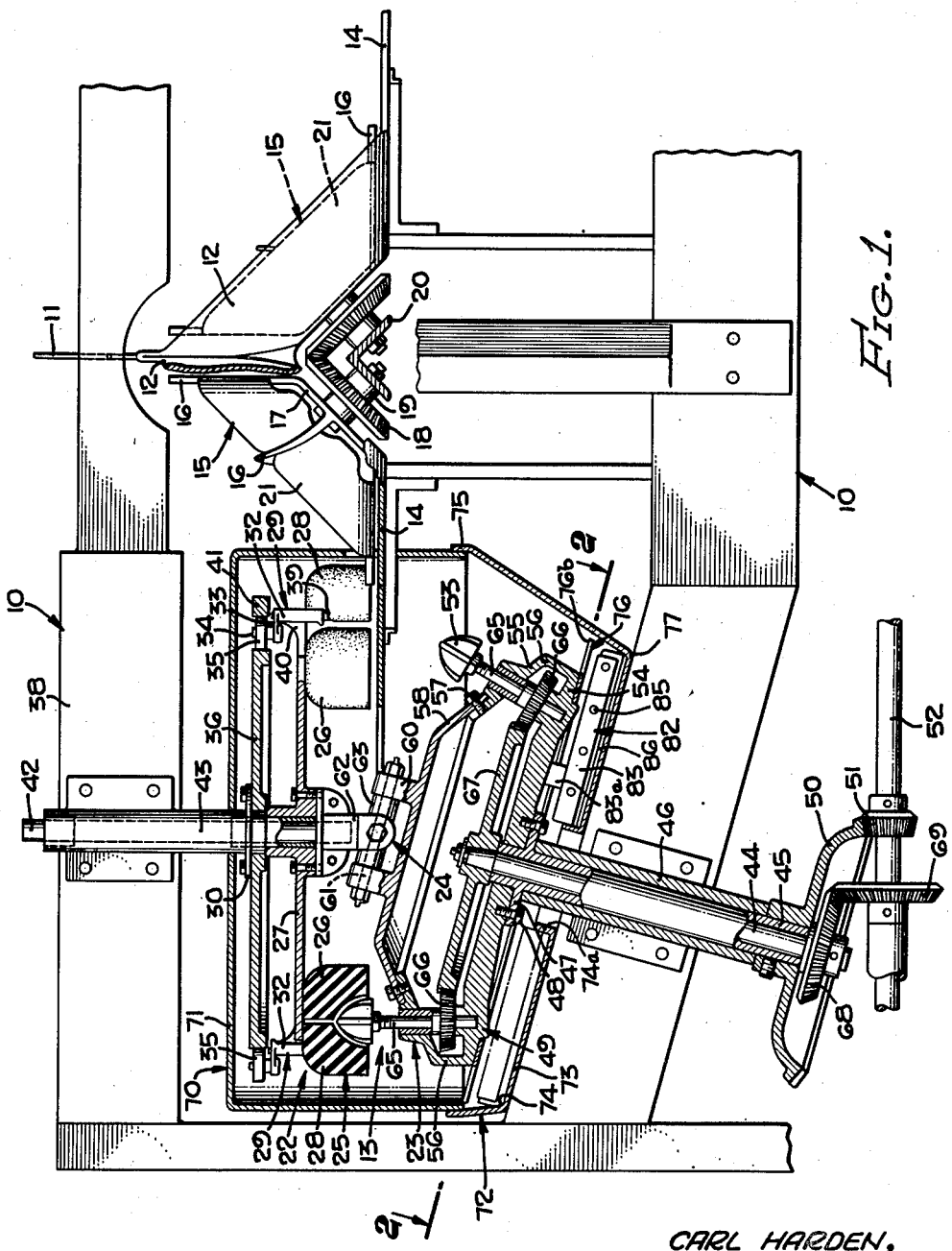
Figure 1 is a vertical sectional elevation of a citrus juice extracting machine embodying my invention.
Figure 2:
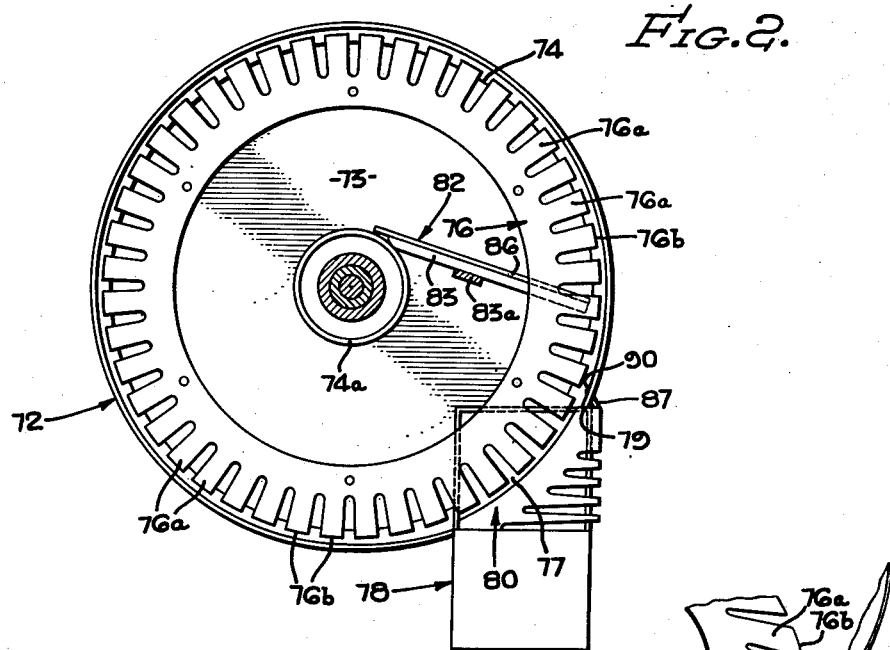
Figure 2 is a sectional elevation taken substantially on the line 2—2 of Figure 1.
Figure 3:
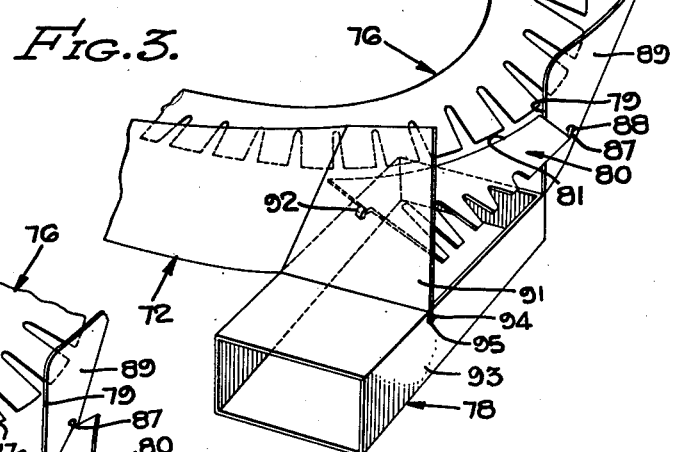
Figure 3 is a fragmentary perspective view illustrating the rotating grid and stationary grid, the stationary grid being in operative position.

Referring now to the drawings, the citrus juice extracting machine embodying my invention is supported on a framework 10 and includes a conveyor (not shown) of the type disclosed in U. S. Patent 2,199,876 to William O. Brown, for carrying individual citrus fruit from a hopper (not shown) into engagement with the vertical knife blade 11 where the fruit is halved. The fruit halves slide across the knife blade and onto curved divider plates 12 which cause the fruit to be presented cut half downwardly to the pair of juice extracting mechanisms 13. The machine is built in duplex, one half of the fruit going to one side of the machine and the other half of the fruit going to the other. As the juice extracting mechanisms on both sides of the machine are of identical construction it is to be understood that in the following description the machine as described with respect to the handling of one half of the fruit is duplicated on the other side of the machine for the handling of the other half of the fruit.

The divider plate 12 curves from a vertical plane at the knife 11 to a horizontal plane where it merges into a horizontal delivery platform 14 adjacent the juice extracting mechanism 13 which is substantially similar to that described in said U. S. Patent 2,199,876 to William O. Brown. Means are provided to synchronize the flow of fruit across the divider plate with the action of the juice extracting mechanism, and as shown in the drawings these means may include a selector member generally indicated 15 mounted for rotation on each of the divider plates 12. The selector member includes a plurality of curved arms 16 secured to a plate 17 which in turn is fixed to the hub of a gear 18 on a shaft 19 journaled in a cross-member 20 of the frame 10. The arms 16 extend radially and are connected together at their outer ends by means of webs 21 of sheet metal which form pockets for the reception of the fruit halves. Each of the selector members 15 is rotated by means of the gear 18 on the shaft 19, the two gears 18 being in engagement with each other and one of the gears being driven by a pinion (not shown).

The juice extracting mechanism 13 consists of a fruit cup carrier or pick-up unit 22 mounted for rotation about a vertical axis and a reamer unit generally indicated 23 mounted for rotation about an axis inclined approximately 15° from the vertical, the two units being arranged to operate in synchronism by means of a universal connection 24.

The fruit pick-up unit 22 includes a plurality of cups 25 of resilient material, which are formed in two halves, a fixed half 26 secured to the rotating cup carrier disk 27, and a movable half 28 hinged to the fixed half by means of the pivotal connection 29. The pivotal connection 29 consists of a pivot member 32 having a transversely extending arm 33 in which is journaled a shaft 34 carrying a roller 35 which engages a fixed cam plate 36. The pivot member is turnably supported on a pin 39 mounted on the bearing member 40 which is secured to the fixed cup half 26. The outer edge of the cam plate 36 is shaped so that as the rollers 35 travel around the plate the cups are caused to open and close to pick up and discharge the fruit halves. Positive movement of the opening of the cups is insured by a cam rail 41 secured to the cam plate 36 and shaped to conform with the cam surface. The cup carrier disk 27 is keyed to a vertical shaft 42 mounted in a suitable bearing 43 on the cross bar 38, and the cam plate 36 is bolted to a flange 30 secured to the bearing 43.

Disposed below the lower end of the shaft 42 and extending angularly with respect thereto, is a reamer unit driving shaft 44 mounted in a sleeve 45 which in turn is mounted in a bearing 46 supported on the framework 10. The sleeve 45 is provided with a circular flange 47 to which is attached by means of bolts 48 a circular reamer spindle carrying frame 49. The frame 49 is driven by means of a gear 50 from a gear 51 on drive shaft 52, which shaft is driven by suitable gearing from a motor (not shown). Mounted on the frame 49 are a plurality of reamers 53, there being one reamer for each cup 25. The spindle carrying frame 49 consists of a base plate 54 having formed thereon a circular angularly disposed juice deflecting plate 55 terminating outwardly in a circular rim 56. Secured to the upper circular edge of the plate 55 by means of bolts 57 is a circular head or cap 58 which has formed integral therewith a pair of upstanding arms 60 between which is secured a shaft 61. A split yoke element 62 is bolted to the underside of the cup carrier disk 27 and pivotally connected to a cross-member 63 journaled on the shaft 61. This arrangement forms a universal joint which serves to center the cup unit and reamer unit and to maintain these members in proper relation to each other.

The reamers 53 are mounted on spindles 65, each of which has its lower end journaled in the plate 54 and extends upwardly through a bushing in the deflector plate. The position of the reamers 53 is such that the reamer on the high side of the spindle carrying frame is within one of the cups as shown in Figure 1. For the purpose of rotating the reamers, each reamer spindle 65 is provided with a gear 66 which meshes with a gear 67 secured to the end of shaft 44. The shaft 44 is driven by a gear 68 which meshes with and is driven by a gear 69 on driving shaft 52.

The operation of the pick-up and reaming portions of the machine is as follows: The fruit is picked up from the horizontal delivery platform 14 by a cup 25 which, as it passes over the platform, is completely open. The cup having received the half of fruit closes thereupon by reason of the roller 35 on the cup engaging the cam plate 36, and when the fruit is firmly engaged by the cup it passes beyond the end of the platform 14. At this point the reamer 52 associated with the particular cup holding the fruit starts to enter the fruit. The path of travel of the reamers being angularly disposed with relation to the horizontal travel of the cups, the continued circular movement of the reamers and their associated cups causes the reamer to enter the fruit in the cup. Due to this squeezing action and to the rotation of the reamers with respect to the cups, the juice is extracted from the fruit and is delivered by gravity to the pan 72. The continued circular movement of the reamers and cups causes the reamers to move out of the cups, and at the same time the cam action causes the cups to open to discharge the skin of the fruit. The opened cup then proceeds to pick up another fruit half, as described above.

The fruit pick-up unit and the reamer carrier unit are enclosed in a casing 70 which includes a cylindrical cover member 71 and a juice collecting pan 72. The bottom 73 of the pan is disposed in a plane normal to the axis of the shaft 44 and is circular, the edge 74 of the pan bottom being concentric with the reamer carrier unit. The pan is provided with a central circular lip 74a providing a central opening for the shaft 44 and bearing 46. The sides of the pan slope upwardly and outwardly, terminating in an upper cylindrical section 75 which encircles the lower portion of the cover member 71, the cover member being held in position against the sloping sides of the pan. It will thus be understood that the sides of the pan 72 take the shape of a compound curve disposed between an upper circular portion in a horizontal plane and a lower circular portion in a plane inclined from the horizontal, the lower portion having a smaller diameter than the upper.

Means are provided to separate the fruit peel from the juice and pulp, and as shown in the drawings, particularly Figures 1–4, these means may include an annular separator grid 76 which is secured to the underside of the spindle carrying frame 49 by any convenient means, such as by welding, to rotate with the reamer unit. The grid 76, preferably made of sheet metal, extends outwardly from the frame 49 and is provided with a plurality of radial fingers 76a. The space between the fingers and the clearance between the outer peripheral edge 76b of the grid and the sides of the pan 72 is sufficiently small to prevent the passage of fruit peel therethrough, while permitting the downward flow of juice and pulp onto the pan bottom. It will be noted that the pan sides adjacent the grid are substantially concentric with the grid so that essentially uniform clearance is maintained therebetween about the entire circumference to prevent even small portions of fruit peel from falling through.

The extracted fruit juice and pulp falls by gravity to the pan bottom 73 and flows thereacross to the low side 77 where a juice spout or conduit 78 is provided, leading from the pan to a suitable receptacle (not shown). The reamed peel falls from the cups 25 and is caught by the rotating grid and carried around to be discharged through an opening 79 to the rear of the pan. A stationary grid member 80 bridges the opening 79 above the juice spout 78 to prevent the peel from falling into the spout. The rear edge 81 of the grid 78 is curved as shown to continue the uniform clearance between the rotating grid and the stationary pan.

Means are provided to continuously sweep the pan bottom to prevent the accumulation of pulp, and as shown in the drawings this may include the wiper assembly 82. A wiper arm 83 is provided with a bracket 83a which is secured to the underside of the base plate 54 for rotation with the reamer unit. Mounted on the wiper arm by means of bolts 85 is a wiper blade 86 of rubber-like material. The blade extends between the edge 74 of the pan bottom and the lip 74a and contacts the bottom (see Figure 7) to remove all bacteria-breeding pulp with each revolution of the blade. As pointed out above, the outer edge of the pan bottom is concentric with the reamer unit so that the entire surface of the bottom is thus swept by the wiper blade 86. As shown, the wiper arm is not mounted radially, but rather is mounted tangential to the lip 74a, so that as it moves across the pan bottom, a component of force in a radial direction is imparted to the juice and pulp, continuously tending to push the juice and pulp outwardly toward the periphery of the pan. While only one such wiper is shown, it is apparent that more than one may be provided if desired.

Figure 4:
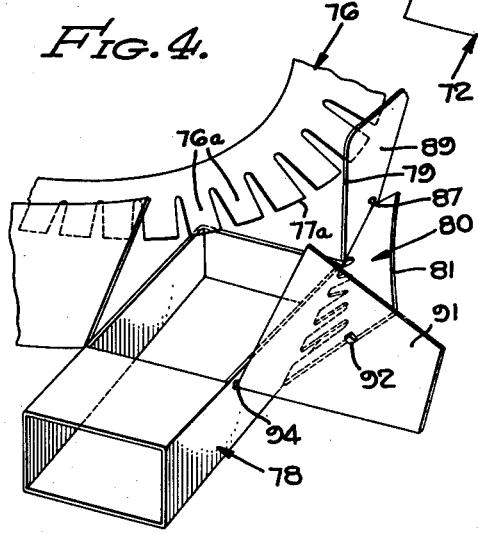
Figure 4 is a perspective view similar to Figure 3 but with the stationary grid in open position.
Figure 5:
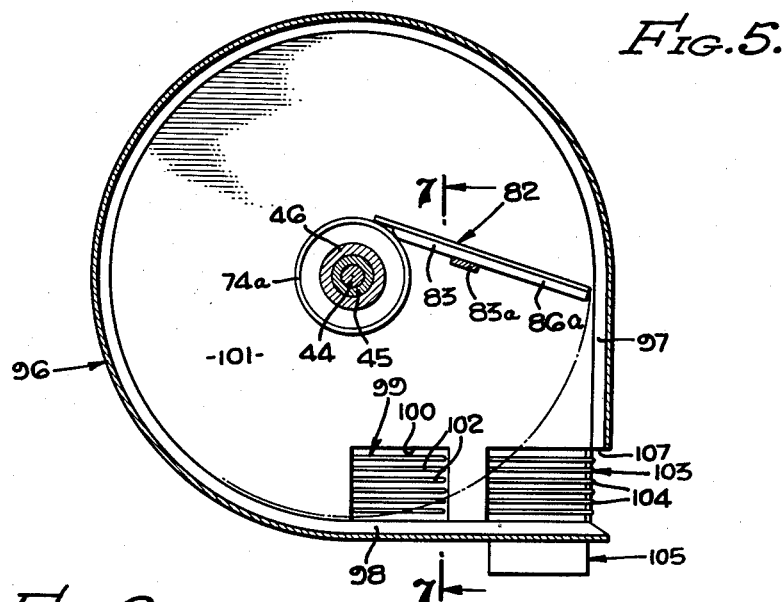
Figure 5 is a sectional elevation similar to Figure 3 but illustrating a modified separator grid.

Periodic cleaning of juice spout 78 is required, and in order to facilitate this the stationary grid 80 is pivotally mounted to provide access to the spout. As shown in Figures 4 and 5, a pin 87 is secured, as by welding, to one corner of the grid 80, the pin extending through an aperture 88 in the pan side 89 and disassembly being prevented by deforming the end of the pin after the fashion of a rivet, as at 90. The other end of the grid 80 is rigidly secured to a splash panel 91 by means of a tab 92 on the grid which extends through an aperture in the panel and crimped thereagainst. The panel 91 is pivotally secured to the side 93 of the juice spout 78 by means of a pin 94 extending through aperture 95. It will be understood that a loose fit is provided between the pins 87 and 94 and the respective apertures so that the grid and splash panel may be swung from the position shown in Figure 4, providing ready access to the juice spout for cleaning.

Figure 6:
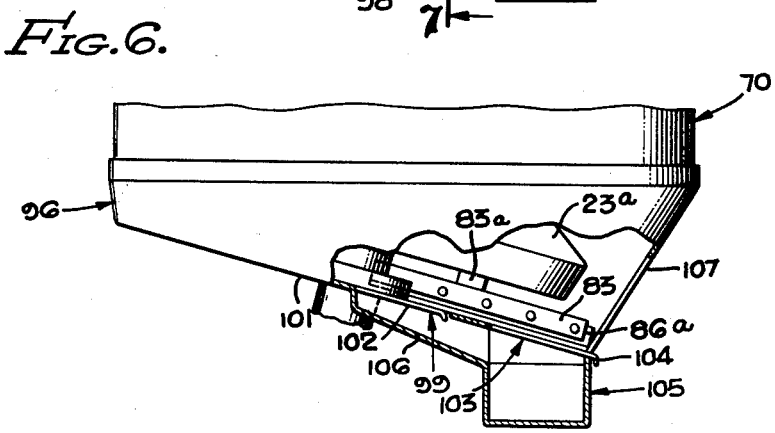
Figure 6 is a fragmentary side elevation partly in section of a reamer unit and juice collecting pan utilizing the modified separator grid of Figure 5.
Figure 7:
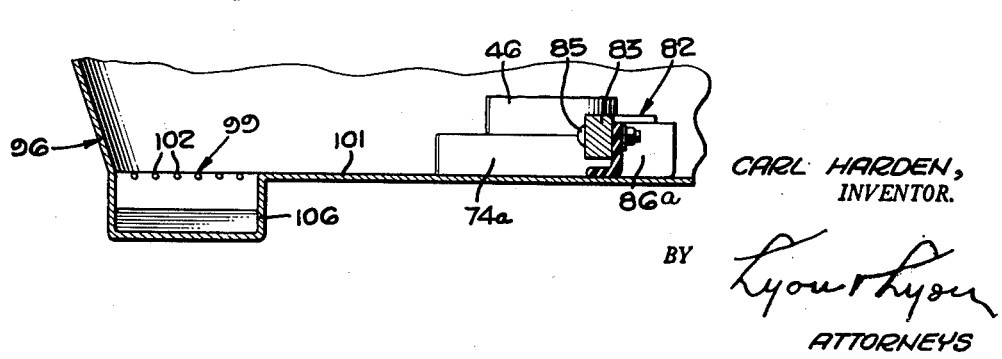
Figure 7 is a sectional elevation taken substantially on the line 7—7 of Figure 5.

A modified form of my invention is illustrated in Figures 5, 6 and 7. Here the juice extracting mechanism includes a reamer unit 23a, similar to that shown in Figure 1, mounted for rotation about an inclined axis as illustrated. The pan 96 is substantially similar to that described above with the exception that the sides adjacent the lower corner are formed tangent to the main body of the pan, as shown at 97 and 98. Here the rotating grid 76 is dispensed with and a grid 99 is substituted therefor. The grid 99 is formed by providing an aperture 100 in the substantially circular pan bottom 101 and securing a plurality of rod or wire members 102 to the bottom and extending across the aperture. A secondary grid 103 is likewise provided, having grid wires 104. The grids 103 and 99 lead into juice spout 105 and juice spout extension 106 fixed below the pan bottom.

Here again the extracted juice and pulp falls into the pan 96 and flows by gravity across the pan bottom toward the juice spout 105. The reamed peel falls to the pan bottom adjacent the grid 99 and moves across the grid wires 102 and 104 through an opening 107 to a hopper (not shown).

It will be noted that the grid 99 is positioned substantially entirely within the sweep area of the wiper blade 86a. With each revolution of the blade the grid is wiped clean of pulp which would otherwise accumulate. The action of the blade 86a forces the juice and pulp over and through the grid wires into the juice spout extension 106. In this manner very little pulp passes over the secondary grid, eliminating pile-up and clogging of pulp and thus reducing the opportunity for bacterial growth. Moreover, loss of juice by spatter through the peel opening 107 is lessened, since the major portion of the juice leaves the pan through the grid 99, a point removed from the peel opening.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. In a citrus juice extracting machine having a reamer unit rotatable about an axis inclined from the vertical, a juice collector pan enclosing said reamer unit, the pan having a circular bottom disposed in a plane normal to the axis of said reamer unit and coaxial therewith, and means within the confines of said pan positioned below said reamer unit and rotating therewith for separating fruit peel from extracted juice and pulp.

2. In a citrus juice extracting machine having a reamer unit rotatable about an axis inclined from the vertical, a juice collector pan enclosing said reamer unit, the pan having a circular bottom disposed in a plane normal to the axis of said reamer unit and coaxial therewith, and a separator grid positioned within said pan and secured to said reamer unit and rotating therewith for separating fruit peel from extracted juice and pulp.

3. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, and an annular separator grid secured to said reamer unit and rotating therewith, said grid being provided with a plurality of radially extending fingers for separating fruit peel from extracted juice and pulp.

4. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, and an annular separator grid secured to said reamer unit and rotating therewith, said grid being provided with a plurality of radially extending fingers for separating fruit peel from extracted juice and pulp, the sides of said juice collector pan sloping upwardly and outwardly from the bottom to provide substantially continuous uniform clearance between the outer circumference of said grid and the pan sides.

5. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, and means for continuously wiping substantially the entire pan bottom.

6. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, and a wiper assembly mounted for rotation with said reamer unit, said wiper assembly carrying a wiper blade adapted to sweep substantially the entire surface of said pan bottom.

7. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, means within the confines of said pan for separating fruit peel from extracted juice and pulp, and means for continuously wiping substantially the entire pan bottom.

8. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, an annular separator grid secured to said reamer unit and rotating therewith for separating fruit peel from extracted juice and pulp, the sides of said juice collector pan sloping upwardly and outwardly to provide substantially continuous uniform clearance between the outer periphery of the grid and the pan sides, and a wiper blade mounted for rotation with said reamer unit, said wiper blade adapted to sweep substantially the entire surface of said pan bottom.

9. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, the sides of the pan sloping upwardly and outwardly to terminate in a portion circular in horizontal section, the pan having a peel opening on the lowermost side thereof, a separator grid secured to said reamer unit and rotating therewith for separating fruit peel from extracted juice, the clearance between the outer periphery of said grid and the sides of the pan being substantially continuously uniform, and a stationary grid bridging the opening in the pan side and cooperating with said sides and said separator grid to continue the uniform clearance therebetween.

10. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, the sides of the pan sloping upwardly and outwardly to terminate in a portion circular in horizontal section, the pan having a peel opening on the lowermost side thereof, a separator grid secured to said reamer unit and rotating therewith for separating fruit peel from extracted juice, the clearance between the outer periphery of said grid and the sides of the pan being substantially continuously uniform, a stationary grid bridging the opening in the pan side and cooperating with said sides and said separator grid to continue the uniform clearance therebetween, said stationary grid being pivotally connected to said pan sides whereby the grid may be pivoted in a direction to provide access to said pan for cleaning thereof.

11. In a citrus juice extracting machine having a reamer unit rotatable about an axis inclined from the vertical, a juice collector pan enclosing said reamer unit, the pan having a circular bottom disposed in a plane normal to the axis of said reamer unit and coaxial therewith, a wiper assembly mounted for rotation with said reamer unit, said wiper assembly carrying a wiper blade adapted to sweep substantially the entire surface of said pan bottom, and a grid positioned in the lower portion of said pan bottom and within the path of sweep of said wiper blade for separating fruit peel from extracted juice and peel.

12. In a citrus juice extracting machine having a reamer unit rotatable about an axis inclined from the vertical, a juice collector pan enclosing said reamer unit, the pan having a circular bottom disposed in a plane normal to the axis of said reamer unit and coaxial therewith, a wiper assembly mounted for rotation with said reamer unit, said wiper assembly carrying a wiper blade adapted to sweep substantially the entire surface of said pan bottom, and a grid positioned in the lower portion of said pan bottom and within the path of sweep of said wiper blade for separating fruit peel from extracted juice and peel, said grid consisting of an aperture in the pan bottom and a plurality of grid wires disposed across said aperture and aligned with the path of travel of said wiper blade.

13. In a citrus juice extracting machine having a reamer unit rotatable about an axis inclined from the vertical, a juice collector pan enclosing said reamer unit, the pan having inner and outer upstanding edges defining an annular bottom disposed in a plane normal to the axis of said reamer unit and coaxial therewith, a wiper assembly mounted for rotation with said reamer unit, said wiper assembly carrying a wiper blade adapted to sweep substantially the entire surface of said pan bottom and positioned so that an inner portion thereof leads an outer portion in its travel about the pan bottom.

14. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having inner and outer upstanding edges defining an annular bottom disposed in a plane normal to the axis of said reamer unit and coaxial therewith, a wiper assembly mounted for rotation with said reamer unit, said wiper assembly carrying a wiper blade adapted to sweep substantially the entire surface of said pan bottom and positioned tangent to the inner upstanding edge.

15. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, the sides of the pan sloping upwardly and outwardly to terminate in a portion circular in horizontal section, the pan having a peel opening on the lowermost side thereof, a separator grid secured to said reamer unit and rotating therewith for separating fruit peel from extracted juice, the clearance between the outer periphery of said grid and the sides of the pan being substantially continuously uniform, a stationary grid bridging the opening in the pan side and cooperating with said sides and said separator grid to continue the uniform clearance therebetwen, and means for continuously wiping substantially the entire pan bottom.

16. In a citrus juice extracting machine, the combination of a fruit pick-up unit rotatable about a vertical axis, a reamer unit below said pick-up unit and rotatable about an axis inclined from the vertical, a juice collector pan enclosing said reamer unit, the pan having a circular bottom disposed in a plane normal to the axis of said reamer unit and coaxial therewith, the sides of the pan sloping upwardly and outwardly to terminate in a portion circular in horizontal section, the pan having a peel opening on the lowermost side thereof, a separator grid secured to said reamer unit and rotating therewith for separating fruit peel from extracted juice, the clearance between the outer periphery of said grid and the sides of the pan being substantially continuously uniform, a stationary grid bridging the opening in the pan side and cooperating with said sides and said separator grid to continue the uniform clearance therebetween, and a wiper blade mounted for rotation with said reamer unit, said wiper blade being adapted to sweep substantially the entire surface of said pan bottom.

References Cited in the file of this patent

UNITED STATES PATENTS

| | | |
|---|---|---|
| 1,789,444 | Mathewson | Jan. 20, 1931 |
| 2,011,211 | Brown | Aug. 13, 1935 |
| 2,065,271 | Faulds | Dec. 22, 1936 |
| 2,199,876 | Brown | May 7, 1940 |
| 2,205,059 | Clark | June 18, 1940 |
| 2,304,929 | Keith | Dec. 15, 1942 |
| 2,311,379 | Gillanders | Feb. 16, 1943 |
| 2,314,206 | Grau | Mar. 16, 1943 |
| 2,365,832 | Monroe | Dec. 26, 1944 |
| 2,428,420 | Green | Oct. 7, 1947 |
| 2,440,425 | Williams | Apr. 27, 1948 |